United States Patent
Reddy et al.

(10) Patent No.: US 7,869,543 B2
(45) Date of Patent: Jan. 11, 2011

(54) SYSTEM AND METHOD FOR SYNCHRONIZATION, POWER CONTROL, CALIBRATION, AND MODULATION IN COMMUNICATION TRANSMITTERS

(75) Inventors: Ajit Kumar Reddy, Matawan, NJ (US); Qing Li, Princeton Junction, NJ (US); Walid Khairy Mohamed Ahmed, Tinton Falls, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 554 days.

(21) Appl. No.: 12/048,013

(22) Filed: Mar. 13, 2008

(65) Prior Publication Data
US 2008/0225981 A1    Sep. 18, 2008

Related U.S. Application Data

(60) Provisional application No. 60/906,940, filed on Mar. 13, 2007.

(51) Int. Cl.
| H04K 1/02 | (2006.01) |
| H04B 1/04 | (2006.01) |
| H04L 25/49 | (2006.01) |

(52) U.S. Cl. .................. 375/296; 375/297; 455/114.3; 455/126

(58) Field of Classification Search .................. 375/296, 375/297; 455/63.1, 114.3, 126
See application file for complete search history.

(56) References Cited

U.S. PATENT DOCUMENTS

| 5,524,286 A | 6/1996 | Chiesa et al. |
| 5,598,436 A | 1/1997 | Brajal et al. |
| 5,745,527 A | 4/1998 | Kelton et al. |
| 5,905,760 A | 5/1999 | Schnabl et al. |
| 6,043,707 A | 3/2000 | Budnik |
| 6,125,266 A | 9/2000 | Matero et al. |
| 6,147,553 A | 11/2000 | Kolanek |
| 6,449,465 B1 | 9/2002 | Gailus et al. |
| 6,600,369 B2 | 7/2003 | Mitzlaff |
| 6,621,340 B1 | 9/2003 | Perthold et al. |
| 6,650,691 B2 | 11/2003 | Cramer, III |
| 6,735,419 B2 | 5/2004 | Mitzlaff |
| 6,834,084 B2 | 12/2004 | Hietala |
| 6,834,183 B2 | 12/2004 | Black et al. |
| 6,850,574 B2 | 2/2005 | Schwent et al. |
| 6,937,874 B2 | 8/2005 | Cramer, III |
| 7,012,970 B2 | 3/2006 | Greenwood et al. |
| 7,020,215 B2 | 3/2006 | Porco et al. |
| 2002/0098812 A1 | 7/2002 | Sourour et al. |
| 2002/0186783 A1 | 12/2002 | Opas et al. |

(Continued)

*Primary Examiner*—Don N Vo
(74) *Attorney, Agent, or Firm*—Allen, Dyer, Doppelt, Milbrath & Gilchrist, P.A.

(57) ABSTRACT

A system is provided for processing a communication signal including a baseband amplitude component and a baseband phase component. The system includes an amplitude predictor configured for closed-loop pre-distortion of a baseband amplitude component, an amplitude lookup table configured for open-loop pre-distortion of the baseband amplitude component, and an amplitude interpolator configured to build up the amplitude lookup table during a closed-loop calibration period. The system also includes a phase predictor configured for closed-loop pre-distortion of a baseband phase component, a phase lookup table configured for open-loop pre-distortion of the baseband phase component, and a phase interpolator configured to build up the phase lookup table during a closed-loop calibration period.

6 Claims, 6 Drawing Sheets

U.S. PATENT DOCUMENTS

| | | |
|---|---|---|
| 2002/0193085 A1 | 12/2002 | Mathe et al. |
| 2003/0095608 A1 | 5/2003 | Duperray |
| 2003/0215025 A1 | 11/2003 | Hietala |
| 2003/0215026 A1 | 11/2003 | Hietala |
| 2004/0021517 A1 | 2/2004 | Irvine et al. |
| 2004/0047432 A1 | 3/2004 | Iwasaki |
| 2004/0198257 A1 | 10/2004 | Takano et al. |
| 2004/0208157 A1 | 10/2004 | Sander et al. |
| 2004/0208259 A1* | 10/2004 | Hunton ........................ 375/296 |
| 2004/0219891 A1 | 11/2004 | Hadjichristos |
| 2004/0252785 A1* | 12/2004 | Demir et al. ................. 375/297 |
| 2005/0017801 A1 | 1/2005 | Bachman, II et al. |
| 2005/0118965 A1 | 6/2005 | Tanabe et al. |
| 2005/0122164 A1 | 6/2005 | Brandt et al. |
| 2005/0122166 A1 | 6/2005 | Premakanthan et al. |
| 2005/0130609 A1 | 6/2005 | Nagode et al. |
| 2005/0243946 A1* | 11/2005 | Chung et al. ................. 375/297 |
| 2006/0109930 A1* | 5/2006 | O'Sullivan et al. ........... 375/296 |
| 2006/0128324 A1 | 6/2006 | Tan et al. |
| 2007/0189417 A1* | 8/2007 | Waheed et al. ............... 375/300 |

* cited by examiner

SYSTEM AND METHOD FOR SYNCHRONIZATION, POWER CONTROL, CALIBRATION, AND MODULATION IN COMMUNICATION TRANSMITTERS

CLAIM OF PRIORITY

This application claims the benefit of the U.S. provisional application 60/906,940, filed on Mar. 13, 2007, which is hereby incorporated by reference.

FIELD OF THE INVENTION

This invention relates to transmission of communication signals, and specifically to synchronization, power control, calibration, and modulation in communication transmitters.

BACKGROUND OF THE INVENTION

Polar modulation is a technique where a signal, or carrier, having constant radian frequency ω, is time-varied in both magnitude and phase. Polar modulation transmitters transmit information that both the magnitude (R) and the phase (θ) of a signal simultaneously carry. There are many benefits to using polar modulation to transmit information, particularly for wireless handset transmitter designs. Polar transmitters receive baseband signals represented in Cartesian form as an in-phase (I) component and a quadrature (Q) component. The IQ baseband signals are converted to polar form in terms of its magnitude R and phase θ signals. The magnitude R is referred to as the amplitude signal and the phase θ is referred to as the phase signal. A coordinate rotation digital computer (CORDIC) algorithm may be employed to convert the IQ baseband signals to polar form amplitude R and phase θ signals. The amplitude R and phase θ signals are processed in separate amplitude and phase paths and may be recombined at the output of the power amplifier. The IQ components may be reconstructed by additional processing downstream of the power amplifier output.

Polar modulation techniques allow a nonlinear device, such as a power amplifier, to operate in the saturation (nonlinear) region with higher power efficiency and longer battery lifetime. As wireless phone standards evolve from 2G to 3G and beyond, for example, EDGE (Enhanced Data GSM Environment) and UMTS (Universal Mobile Telecommunications System), the demand for non-constant envelope modulation using a polar transmitter is growing rapidly due to the potential for benefits in terms of hardware, power savings, and multi-mode flexibility. In nonlinear devices, waveform quality typically increases with a more linear output response. However, some nonlinear devices operate more efficiently when the output response is nonlinear—for example, when a power amplifier approaches saturation. As a result, there is often a tradeoff between waveform quality and efficiency. For example, when a nonlinear device approaches saturation or starts to exhibit nonlinear qualities (which may improve efficiency), the waveform quality may be degraded and may not meet the specific requirements and standards. Alternatively, if nonlinear devices are set to operate in linear regions to meet quality standards or requirements, then power consumption and current drain may be degraded because the device is operating at a lower efficiency level.

Correction of the nonlinearity of the power amplifier becomes extremely challenging as the polar modulation technique is applied to non-constant envelope modulation. Two primary approaches exist: open-loop LUT (Look-Up Table) correction and closed-loop error based correction. Open-loop correction is relatively simple, but needs significant manufacturing calibration for collecting tables or calculating the coefficients, and suffers performance loss if the device nonlinearity varies once out of the manufacturing environment and the pre-collected tables or pre-calculated coefficients are no longer accurate enough. The error based closed-loop correction, either non-adaptive or adaptive, is a classical linear control loop scheme and fails at delivering accurate correction to severe nonlinearity, especially for a high gain loop with large delay. Thus, there is a need for reliable and efficient systems and methods for synchronization, power control, calibration, and modulation (SPCM) in communication transmission systems.

BRIEF SUMMARY

According to one aspect of the invention, there is a system for processing a communication signal including a baseband amplitude component and a baseband phase component. The system includes an amplitude predictor configured for closed-loop pre-distortion of a baseband amplitude component, an amplitude lookup table configured for open-loop pre-distortion of the baseband amplitude component, and an amplitude interpolator configured to build up the amplitude lookup table during a closed-loop calibration period. The system also includes a phase predictor configured for closed-loop pre-distortion of a baseband phase component, a phase lookup table configured for open-loop pre-distortion of the baseband phase component, and a phase interpolator configured to build up the phase lookup table during a closed-loop calibration period.

Other systems, methods, features and advantages of the nonlinear feedback control system will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

The term "signal," as is used herein, should be broadly construed to include any manner of conveying data from one place to another, such as, for example, an electric current or electromagnetic field, including without limitation, a direct current that is switched on and off or an alternating-current or electromagnetic carrier that contains one or more data streams. Data, for example, may be superimposed on a carrier current or wave by means of modulation, which may be accomplished in analog or digital form. The term "data" as used herein should also be broadly construed to comprise any type of intelligence or other information, such as, for example and without limitation, audio, video, and/or text information.

Figure 1:
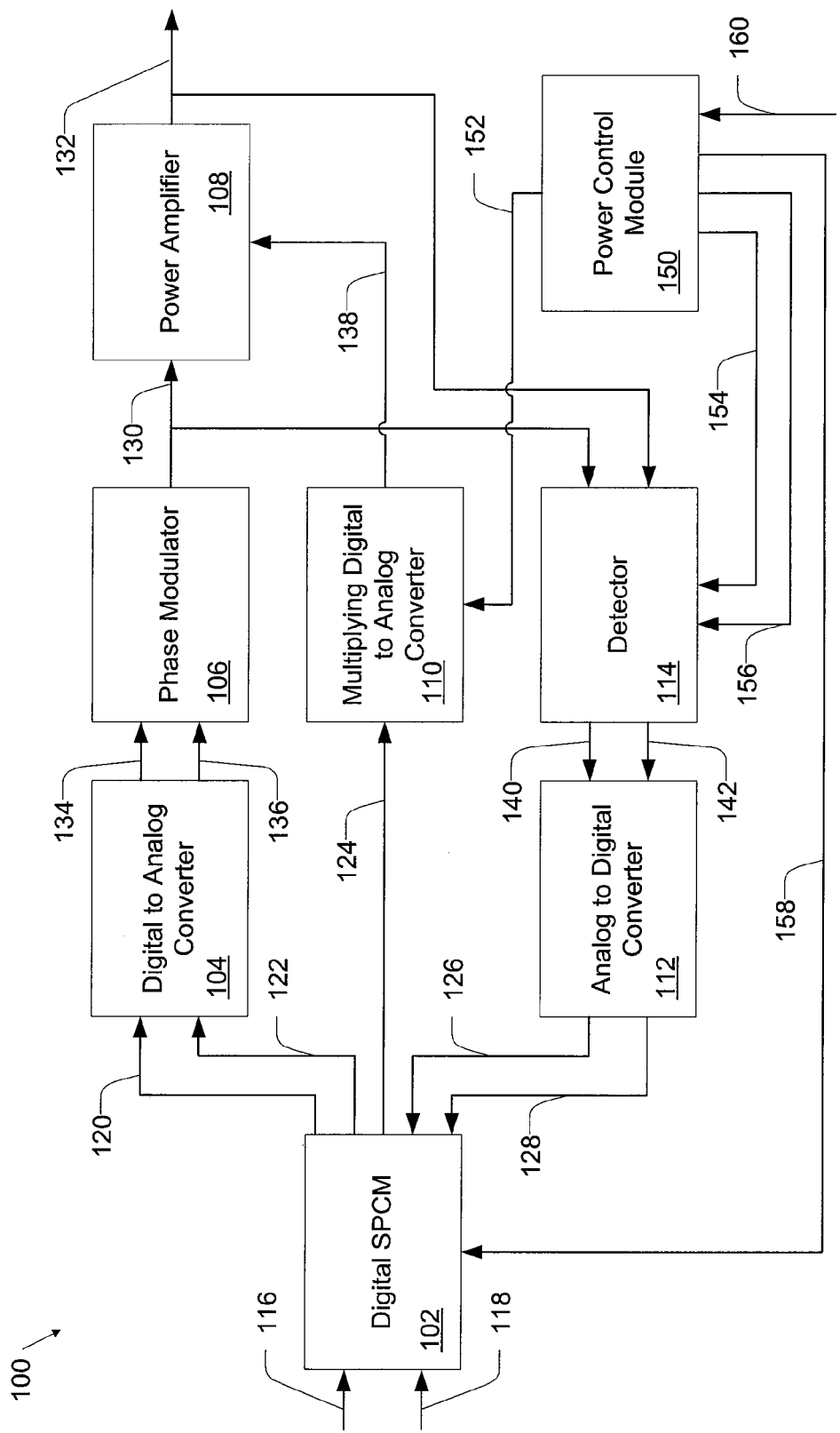
FIG. 1 is a block diagram of a digital polar transmitter including a digital SPCM module according to one aspect of the invention.

FIG. 1 is a block diagram of a digital polar transmitter 100 including a digital SPCM module 102 according to one aspect of the invention. The transmitter 100 also includes a digital-to-analog converter 104, a phase modulator 106, a power amplifier 108, a multiplying digital-to-analog converter 110, an analog-to-digital converter 112, a detector 114, and a power control module 150. The digital SPCM module 102 receives a digital phase signal 116 and a digital amplitude signal 118 and digitally processes the signals 116 and 118 into a digital pre-distorted in-phase (I) and quadrature (Q) signals 120, 122 representing the pre-distorted baseband phase component, as well as a digital pre-distorted baseband amplitude component 124. The pre-distorted phase component IQ signals 120, 122 are provided to the digital-to-analog converter 104 and the pre-distorted baseband amplitude component 124 is provided to the multiplying digital to analog converter 110. The digital SPCM module 102 also receives digital IQ feedback signals 126, 128 from the analog-to-digital converter 112. The digital IQ feedback signals 126, 128 are derived from a phase-modulated radio frequency (RF) carrier signal 130 and an amplified RF signal 132 (output by the power amplifier 108). The digital SPCM module 102 uses the digital IQ feedback signals to correct for errors due to nonlinearity in the power amplifier 108 or other components, discussed in more detail below.

The digital SPCM module may digitally pre-distort the original baseband amplitude and phase components 116, 118 in either of a closed-loop or an open-loop mode of operation. In the closed-loop mode, the pre-distortion is based on the digital feedback signals 126, 128. In the open-loop mode, the pre-distortion is based on lookup tables (LUT), which the SPCM module may generate during a calibration period, as discussed in more detail below.

The SPCM synchronizes the pre-distorted baseband amplitude and phase components before generating the pre-distorted baseband phase component IQ signals 120, 122, and the pre-distorted baseband amplitude component 124. The digital-to-analog converter 104 converts the pre-distorted baseband phase component IQ signals 120, 122 to analog baseband phase component IQ signals 134, 136. The phase modulator 106 modulates an RF carrier signal based on the signals 134, 136 to generate the phase-modulated RF carrier signal 130. This partially-modulated RF signal is provided to the power amplifier 108 as a nearly constant envelope modulated phase signal. In parallel, the pre-distorted baseband amplitude component 124 is provided to the multiplying digital-to-analog converter 110, which multiplies and converts the digital pre-distorted baseband amplitude component 124 to an analog pre-distorted amplitude signal 138. This signal may be used to bias the power amplifier 108, which effectively combines the phase-modulated RF carrier signal 130 and the analog pre-distorted baseband amplitude component 138 to generate the amplified RF output signal 132.

The detector 114, which forms part of a feedback loop, receives the phase-modulated RF carrier signal 130 from the phase modulator 106 and also receives the amplified RF output signal 132 from the power amplifier 108. The detector 114 detects the amplitude of the amplified RF signal 132 and the phase error caused by nonlinearity of the power amplifier 108. The detector 114 attenuates, down-converts, corrects for analog DC offset, and amplifies these signals. The detector 114 also converts the signals 130, 132 into analog IQ feedback signals 140, 142, which the analog-to-digital converter 112 converts to the digital IQ feedback signals 126, 128 described above. The detector 114 may use sub-sampling or other techniques to process and down-convert the amplified RF signal 118 prior to conversion into the IQ feedback signals 140, 142. As previously discussed, the digital IQ feedback signals 126 and 128 generated by the converter 112 are received by the digital SPCM module 102 and used to correct errors caused by the nonlinearity of the power amplifier 108.

The power control module 150 controls power levels in various components of the transmitter 100 by providing power control signals 152, 154, 156, 158. For example, these signals may be based on a required power level signal 160 received by the power control module from a wireless communication network or base station. One of the power control signals is a dynamic range scaling control signal 152 the power control module 150 provides to the multiplying DAC 110. The power control module 150 also provides a baseband gain control signal 154 and an RF attenuation control signal 156 to the detector 114, as well as a digital gain control signal 158 to the SPCM module 102.

Figure 2:
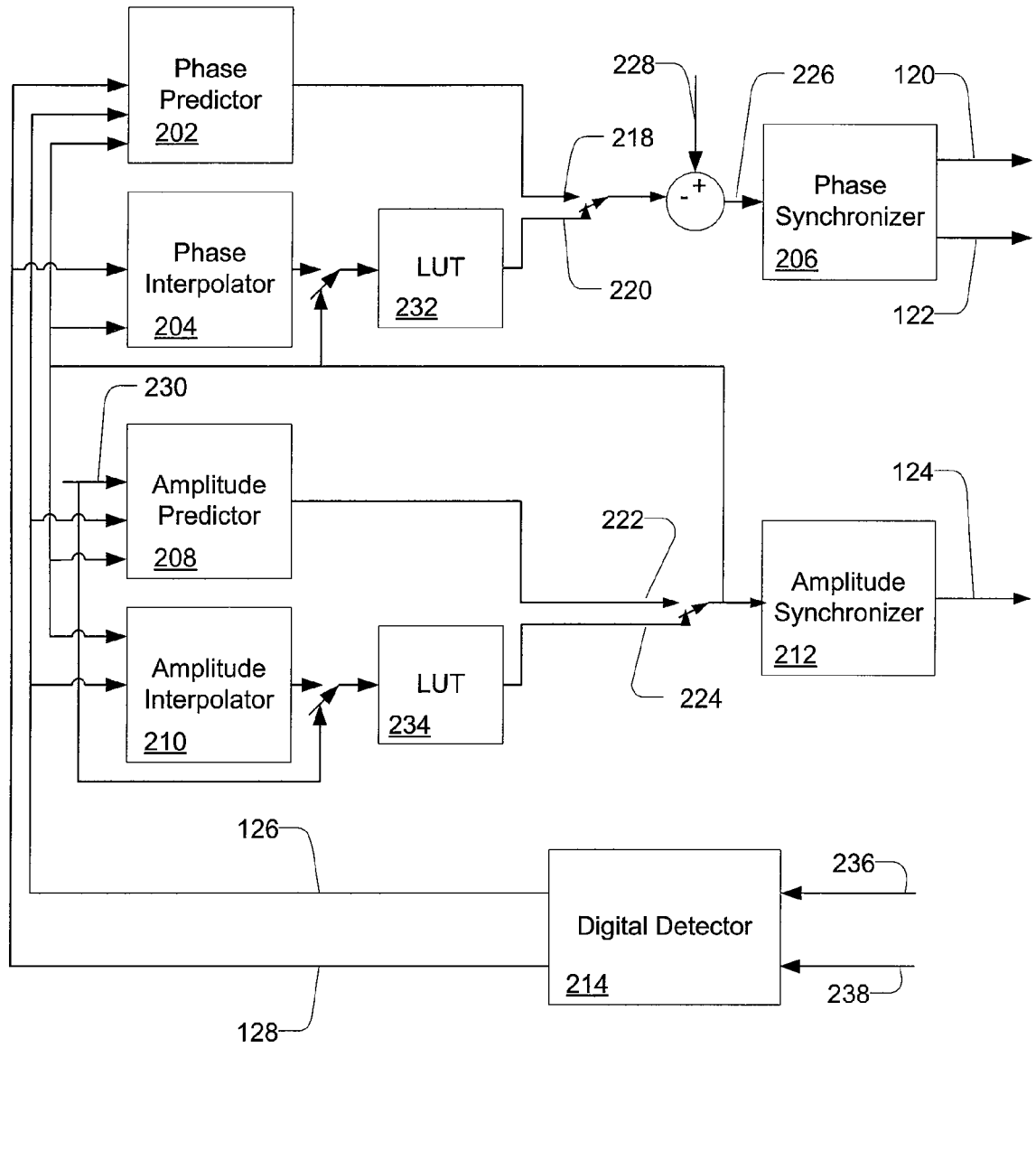
FIG. 2 is a block diagram of a digital SPCM system according to another aspect of the invention.

FIG. 2 is a block diagram of the digital SPCM system 102, which may comprise a portion of the digital polar transmitter 100. For example, the SPCM system 102 may be part of a baseband processor in a digital polar transmitter 100. Portions of the SPCM system 102 also may be implemented in a transmitter 100 as part of a digital feedback loop. The system 102 may be used in GSM and EDGE implementations and may also be adapted for use in other wideband technologies, including, for example, WCDMA, WiMAX, HSPA, and UMTS.

The system 102 includes a phase predictor 202, a phase interpolator 204, and a phase synchronizer 206. The system 102 also includes an amplitude predictor 208, an amplitude interpolator 210, and an amplitude synchronizer 212. Also included in the system 102 are a digital detector 214 and power control module 216.

The SPCM system 102 may be configured to perform a variety of functions related to amplitude and phase correction, or pre-distortion. The system 102 may perform closed-loop predictive correction of the amplitude and phase to correct for nonlinearities in the transmitter 100 or other devices. The SPCM system 102 also may be configured to construct amplitude and phase correction lookup tables 234, 232. For example, the system 102 may construct these lookup tables 234, 232 during a calibration period or ramp-up of the transmitter. The SPCM system also may be configured to perform open-loop amplitude and phase correction based on these lookup tables. In this open-loop mode, the phase and amplitude predictors and interpolators 202, 204, 208, 210 may be disabled to conserve power.

The phase predictor 202 and amplitude predictor 208 may be configured to provide closed-loop phase and amplitude correction signals 218, 222, respectively, based on predicted changes in the phase or amplitude of the transmitter output. The predictions may be based, for example, on signals provided by the digital detector 214. The phase correction signal 218 and the amplitude correction signal 222 effectively pre-distort the baseband phase and amplitude components 116, 118 to provide a desired linear output from the power amplifier 108.

The phase interpolator 204 and amplitude interpolator 210 may be configured to build baseband amplitude and phase correction lookup tables 234, 232 by interpolating pre-distortion values or parameters based on feedback from the digital detector 214 and other inputs. For example, the phase and amplitude interpolators 204, 210 may construct these lookup tables 232, 234 based on information from the digital detector 214 and/or the phase and amplitude predictors 202, 208, during a calibration period or ramp-up of the transmitter. During the buildup period, the lookup tables 232, 234 are connected to the phase and amplitude interpolators 204, 210, respectively. In addition, the phase and amplitude correction lookup tables 232, 234 may be configured to provide open-loop phase and amplitude correction signals 220, 224, respectively. During this open-loop operation, the amplitude lookup table 234 is driven by the original baseband amplitude component 230, and the phase lookup table 232 is driven by the output from the amplitude lookup table 234.

Depending on the mode of operation (closed-loop or open-loop), either the phase predictor 202 or the lookup table 232 provides a phase correction signal 218, 220. The phase correction signal 218 is a pre-distortion parameter that is subtracted from the original baseband phase signal 228. The resulting signal is then synchronized by phase synchronizer 206 to generate the pre-distorted baseband phase component IQ signals 120, 122. Likewise, either the amplitude predictor 208 or the lookup table 234 provides an amplitude correction signal 222, 224, which is a pre-distorted amplitude signal. This signal is then synchronized by the amplitude synchronizer 212 to generate the pre-distorted baseband amplitude component 124.

The digital detector 214, which may be part of a digital feedback loop, receives digital IQ signals 236, 238 from other components of the digital feedback loop. Based on these digital IQ signals, the digital detector 214 generates the detected amplitude signal 126 and the detected phase signal 128. As discussed above, the original feedback signal may be attenuated, down-converted, corrected for analog DC offset, amplified, and converted to the digital IQ signals 236, 238. The digital detector 214 balances and corrects the IQ signals for digital DC offset, and then converts the digital IQ signals 236, 238 into the detected amplitude signal 126 and the detected phase signal 128. The conversion of the digital IQ signals 236, 238 into the detected amplitude and phase signals 126, 128 may be accomplished using CORDIC algorithm or suitable rectangular-to-polar conversion technique. The power control module 216 also may control and define values (not shown) for attenuation and analog gain in other portions of a digital feedback loop, as well as dynamic range scaling for a multiplying digital to analog converter.

The phase predictor 202 receives the detected amplitude and phase signals 126, 128 from the digital detector 214. The phase predictor 202 also receives the amplitude correction signal 222 from the amplitude predictor 208. The phase predictor 202 uses these signals to generate the phase correction signal 218.

The amplitude predictor 208 receives the original baseband amplitude signal 230, the detected amplitude signal 126 from the digital detector 214, and the amplitude correction signal 222 from the amplitude predictor 208. The amplitude predictor 208 uses these signals to generate the amplitude correction signal 222. The operation of the phase and amplitude predictors 202, 208 is discussed in more detail below.

The phase interpolator 204 receives the phase detection signal 128 from the digital detector 214, and the amplitude correction signal 222 from the amplitude predictor 208. The phase interpolator 204 uses these signals to build up the phase correction lookup table and/or to generate the phase correction signal 220. Similarly, the amplitude interpolator 210 receives the amplitude detection signal 126 from the digital detector 214 and the amplitude correction signal 222, 224 from either the amplitude predictor 208 or the lookup table 234, depending on whether the operation is closed-loop or open loop. The amplitude interpolator 210 uses these signals to build up the amplitude correction lookup table and/or to generate the amplitude correction signal 224. The operation of the phase and amplitude interpolators 204 and 210 is discussed in more detail below.

Figure 3:
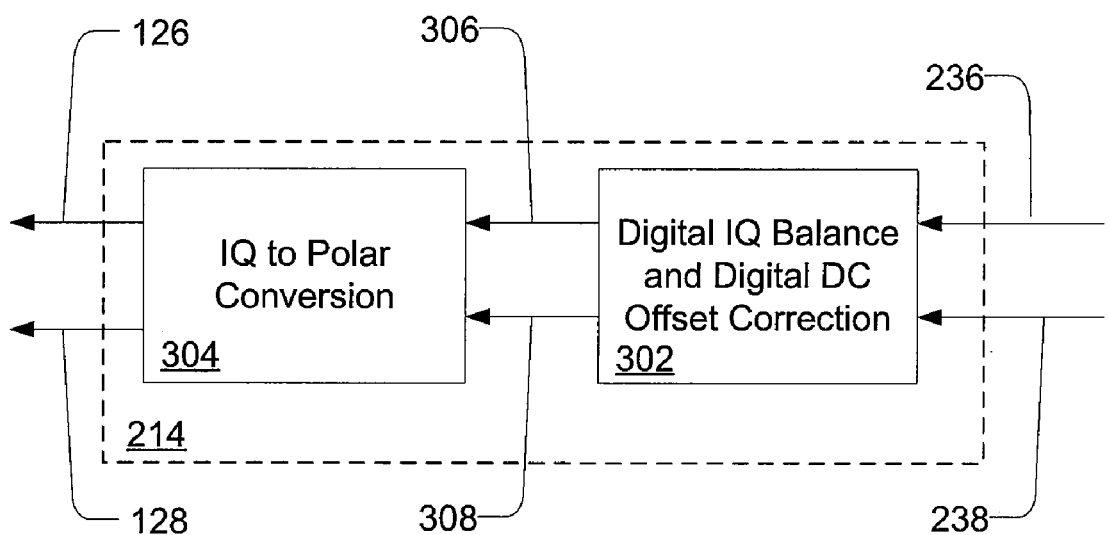
FIG. 3 is a block diagram of a digital detector for use with an SPCM system according to another aspect of the invention.

FIG. 3 is a block diagram of the digital detector 214 for use with an SPCM system according to another aspect of the invention. The digital detector 214 includes a digital IQ balance and digital DC offset correction block 302, and an IQ to polar converter 304 in communication with block 302. The digital detector 214 in FIG. 2, which converts digital IQ signals 236, 238 to the amplitude detection signal 126 and the phase detection signal 128, is comprised of block 302 and converter 304. The block 302 receives the digital IQ signals 236, 238, balances the signals 236, 238, and DC offset corrects the signals 236, 238 to intermediate IQ signals 306 and 308. The intermediate IQ signals 306 and 308 are then converted by the IQ to polar converter 304 into the amplitude detection signal 126 and the phase detection signal 128. The conversion of the digital IQ signals 236, 238 into signals 126, 128 in the IQ to polar converter 304 may use a CORDIC algorithm or other techniques for rectangular-to-polar conversion.

Figure 4:
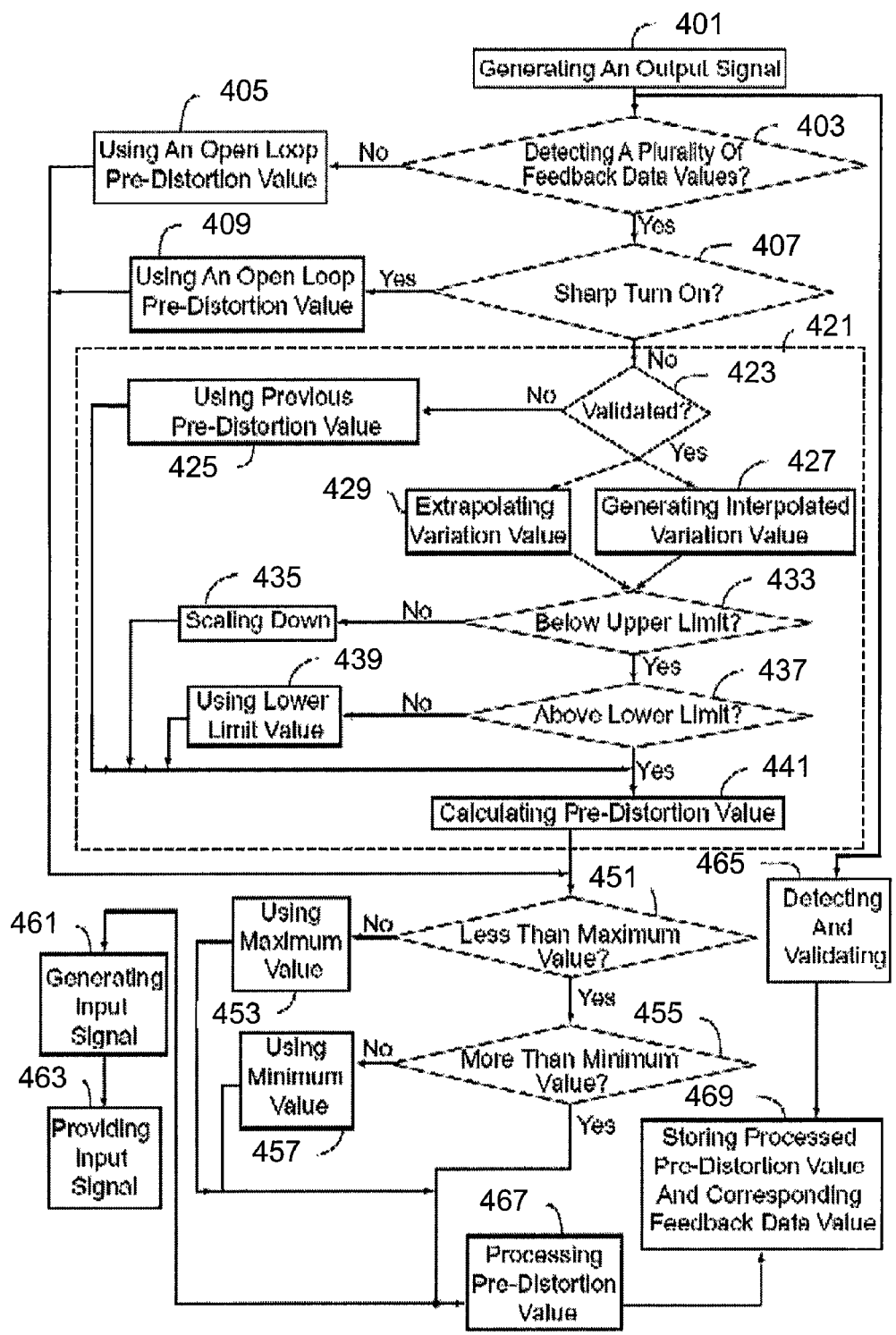
FIG. 4 is a flow diagram illustrating operation of a predictor for pre-distorting a nonlinear device, such as a power amplifier for use with a digital polar transmitter, according to another aspect of the invention.

FIG. 4 is a flow diagram illustrating operation of a predictor for pre-distorting a nonlinear device, such as a power amplifier for use with a digital polar transmitter, according to another aspect of the invention. For example, this operation may be used with the phase predictor 202 and/or the amplitude predictor 208 described above. In FIG. 4, for example, the nonlinear device generates an output signal, as in block 401. Then the function of detecting a plurality of feedback data values, d(k), such as at least two feedback data values, occurs, as in block 403. If the plurality of feedback data values is not detected, which may occur due to loop delay, then an open loop pre-distortion value, which is generated from a predefined pre-distortion function or pre-load table, is used, as in block 405. The open loop pre-distortion value is then sent to a checking block 451, bypassing block 421. If the plurality of feedback data values, d(k), is detected, then the feedback data values are checked for a sharp turn-on, as in block 407. If the feedback data values are below a specified turn-on threshold, then an open loop pre-distortion value, which is generated from a predefined pre-distortion function or pre-load table, is used, as in block 409. Being below the specified turn-on threshold means that a sharp turn-on exists. The open loop pre-distortion value is then sent to the checking block 451, bypassing block 421. If the feedback data values are above a specified turn on threshold, then a validating function will occur, as in block 423.

The validating function includes, but is not limited to, comparing the noise level of the feedback data values, d(k), with a threshold noise level. If the noise level of a certain number of the plurality of feedback data values, such as at least one, is above the threshold noise level, then those feedback data values will be discarded and a previous variation value that was extrapolated or interpolated, v(k−1), will be used, as in block 425, to be sent to a calculating pre-distortion value block 441. However, if the noise level of a certain number of the plurality of feedback data values, d(k), is below the threshold noise level, then a variation value, v(k), is extrapolated using the feedback data values, d(k), if the expected output signal value is beyond a range of feedback data values already detected, as in block 429. Other mathematical values, in addition to the feedback data values, may be used for the extrapolation. Alternatively, a variation value is interpolated from stored feedback data values and stored processed pre-distortion values if the expected output signal value is within a range of feedback data values already detected, as in block 427.

An extrapolated variation value or an interpolated variation value is checked to see if its value is above a certain upper limit, as in block 433. If the variation value is above the upper limit, the system may be noisy and unstable. If the variation value is not less than the upper limit, then the variation value is scaled down, as in block 435, and is used to calculate a pre-distortion value, as in block 441. If the variation value is less than the upper limit, then it is checked to see if it is more than a lower limit, as in block 437. If the variation value is not more than the lower limit, then the lower limit value is used, as in block 439, to calculate a pre-distortion value, as in block 441. If the variation value is more than the lower limit, then it is used for calculating the pre-distortion value, as in block 441.

Then the pre-distortion value is checked to see if it is less than a maximum value, as in block 451. If it is not, then the maximum value is used, as in block 453, to be sent to block 461, as well as block 467 if the pre-distortion value was calculated in block 441. If the pre-distortion value is less than the maximum value, then it is checked to see if it is more than a minimum value, as in block 455. If it is not, then the minimum value is used, as in block 457, to be sent to block 461, as well as block 467 if the pre-distortion value was calculated in block 441. The maximum and minimum values may vary based on hardware limitations. Furthermore, if the pre-distortion value is more than the minimum value, then it is smoothed, by averaging and filtering, and used to generate an input signal, as in block 461. The input signal, which may be a pre-distortion phase or amplitude, is provided to the nonlinear device, as in block 463. Also, if a pre-distortion value was sent to block 467, then it will be processed.

The processing may entail filtering as well as delaying the pre-distortion value, p(k), to correspond with an appropriate feedback data value, d(k). Also, the function of detecting, similar to block 403, and validating, similar to block 423, a plurality of feedback data values, d(k), occurs, as in block 465. Then a feedback data value and a corresponding processed pre-distortion value, which is substantially the digital representation of the input signal, x(k), are stored in a lookup-table, as in block 469. Any one of a variety of numerical techniques can be used for the extrapolation or interpolation of the variation value, v(k), and the calculation of the pre-distortion value, p(k), as well as other math computations discussed above. For example, Spline, Cubic-Hermite, Linear, Polynomial, or other mathematical techniques may be used. Also, values associated with the reference signal, Ŷ(k), are used in the mathematical computations discussed above.

Figure 5:
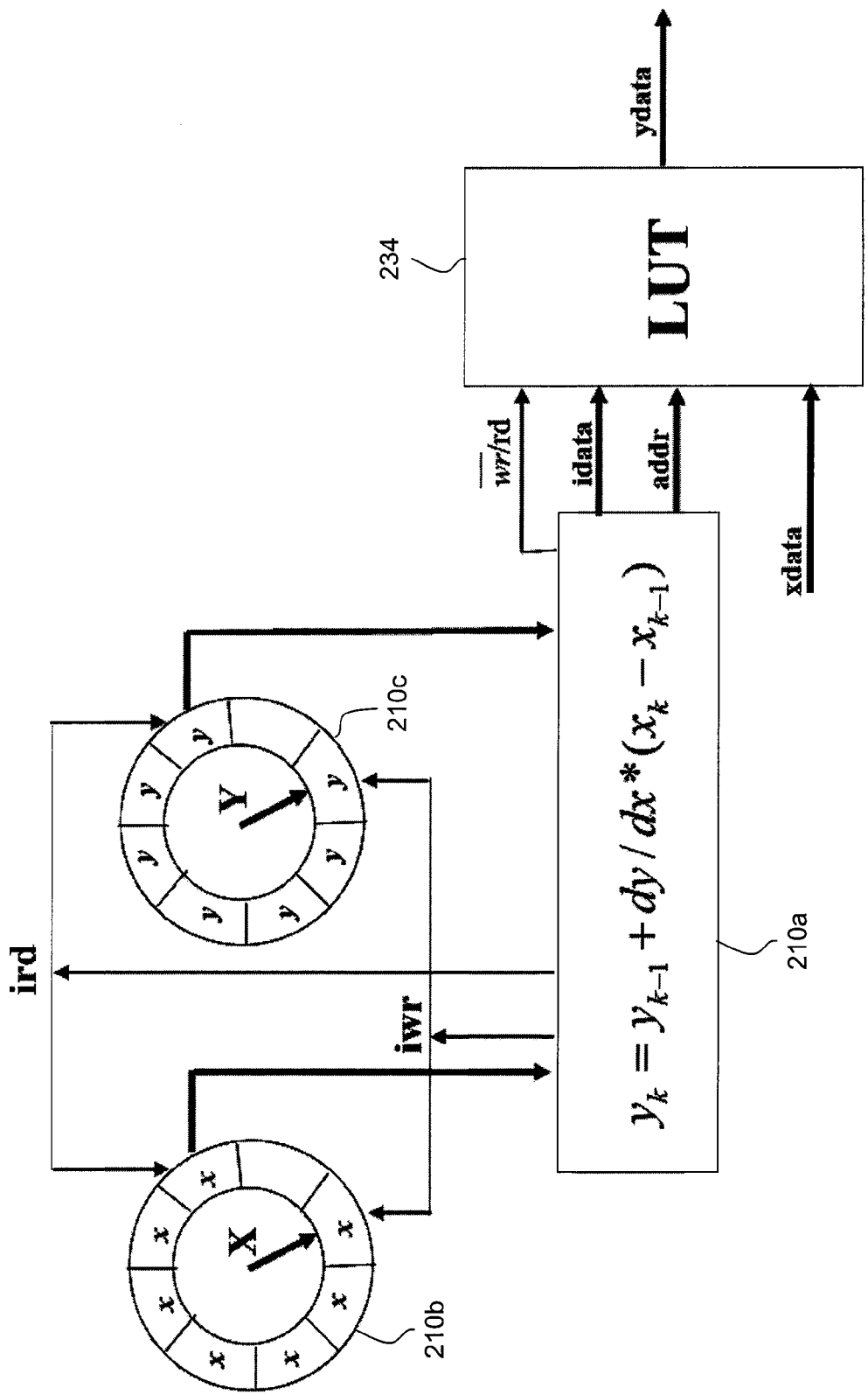
FIG. 5 is a block diagram of an interpolator and a lookup table for pre-distorting a device input according to another aspect of the invention.

FIG. 5 is a block diagram of an interpolator 210 and a lookup table 234 for pre-distorting a device input according to another aspect of the invention. The interpolator 210 includes a processor 210a and two circular buffers 210b, 210c. The processor 210a uses signals iwr and ird to control operations for writing to and reading from the circular buffers 210b, 210c. The processor uses signals wr/rd, idata, and addr to control operations for writing to and reading from the lookup table 234. The processor 210a is configured to receive an original device input X (e.g., original baseband amplitude signal 222) and to generate a pre-distorted device input Y (e.g., amplitude correction signal 224) designed to compensate for the nonlinear response of the device (e.g., power amplifier 108). Alternatively, Y may be a pre-distortion parameter used to adjust the original input value X to achieve the desired linear device output. For example, a pre-distortion parameter Y may be an offset that is added to the original input value X, a factor that is multiplied by the original input value X, or any other suitable parameter to adjust the original input value X. The phase interpolator 204 and lookup table 232 shown in FIG. 2 are an example of this approach.

During a calibration period, the processor acquires a set of known data pairs, each pair including an X value and a Y value. For example, the data acquisition may be performed as described above with respect to FIGS. 2 and 4.

The calibration period during which this acquisition of known data pairs takes place may involve processing a specific set of original input values designed to produce a particular set of known data pairs. Alternatively, the processor may leverage a standardized calibration or startup routine to acquire the known data pairs. For example, in a GSM/EDGE implementation, a standard ramp-up period may be used as the calibration period to acquire known data pairs. Because the data acquisition is performed during the closed-loop calibration period based on feedback from the actual device output, the acquired data reflects the current nonlinearity of the transmitter 100 and/or power amplifier 108 at the time of calibration. In addition, the calibration process may be performed periodically to account for changes in the nonlinearity of the transmitter 100 and/or power amplifier 108.

The set of known data pairs acquired during the calibration period may not be complete. There may be data pairs missing from the set. For example, the original input signal processed during the calibration period may not involve every possible original input value. This results in holes in the set of known data pairs. The interpolation processor 210a may be configured to interpolate or extrapolate one or more data values to fill these holes.

To identify missing data values, the processor 210a temporarily stores values of at least some of the known data pairs in the buffers 210b, 210c. As illustrated, the X values may be stored in the first circular buffer 210b, and the Y values may be stored in the second circular buffer 210c. The processor 210a may then sort the known data pairs and search for holes in the data set. For example, the processor 210a may sort the known data pairs in order of their X values. Once a hole has been identified, the processor 210a determines a data value to fill the hole using an interpolation/extrapolation formula. For example, the processor 210a shown in FIG. 4 uses the following equation:

$$y_k = y_{k-1} d + dy/dx*(x_k - x_{k-1}).$$

Other interpolation/extrapolation formulas also may be used. In this way, the processor 210a augments the set of known data values with interpolated or extrapolated data. The processor 210a stores the augmented set of data pairs in the lookup table 234. (The augmented set of data pairs is different from the augmented EDGE data burst described above.)

After the calibration period is complete, the values in the lookup table 234 are used to pre-distort the device input. In response to a particular original input data value $x_i$, the corresponding pre-distorted input value $y_i$ (or a pre-distorted input value determined from a pre-distortion factor $y_i$) is provided from the lookup table 234. Because a complete set of Y values has been assembled during the calibration period through collection, interpolation, and/or extrapolation, the lookup table 234 can be used to reliably pre-distort the device input for a desired linear output in an efficient open-loop operating mode. At this point, the digital feedback loop 108 of the transmitter 100 may be disabled and the transmitter 100 operates in an efficient open-loop operational mode. In this mode, the lookup table 234 provides a pre-distorted device input (e.g., amplitude correction signal 224) or a pre-distortion factor, as is the case with phase correction signal 220, through use of the data pairs stored in the lookup table 234. As a result, the transmitter 100 provides the desired linear output.

Figure 6:
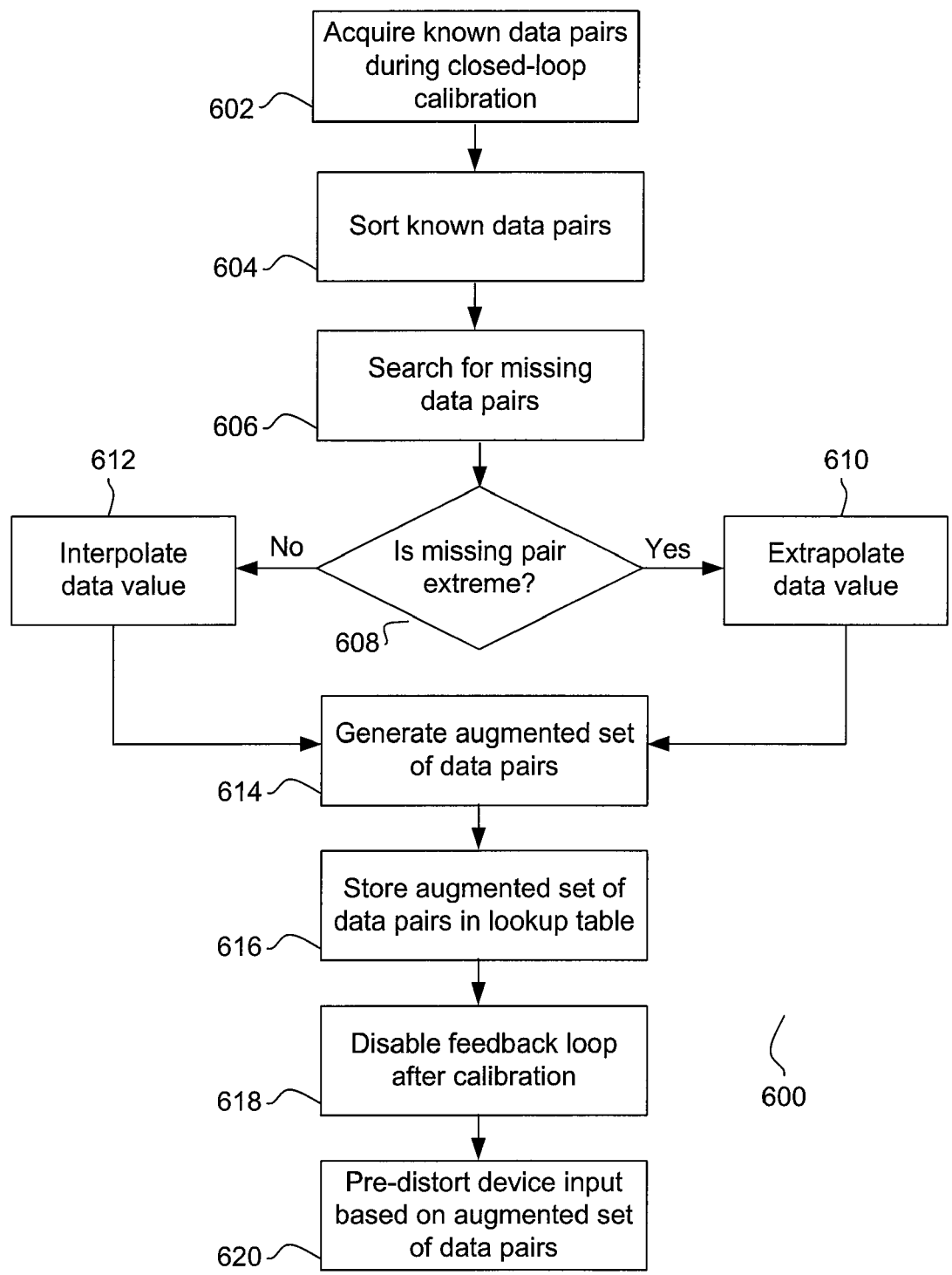
FIG. 6 is a flow diagram illustrating a method for pre-distorting a device input according to another aspect of the invention.

FIG. 6 is a flow diagram illustrating a method 600 for pre-distorting a device input according to another aspect of the invention. A set of known data pairs is acquired 602 during a closed-loop calibration period. For example, known data pairs may be acquired in the manner described above. The known data pairs are then sorted 604, and a search 606 is conducted for missing data pairs, also known as holes in the data. When a missing data pair is identified, it is determined 608 whether or not the missing data pair is an extreme. A missing data pair is an extreme if it falls outside the range of values of known data pairs. If the missing data pair is an extreme, then a data value may be extrapolated 610 based on the values of known data pairs to fill the hole. If the missing data pair is not an extreme, then a data value is interpolated 612 based on other known data values to fill the hole. As an alternative, the method 600 may fill holes in the known data pairs only through interpolation, not extrapolation. In this case, there would be no attempt to fill holes resulting from extreme missing data pairs.

An augmented set of data pairs is generated 614. The augmented set of data pairs includes the known data pairs and one or more interpolated or extrapolated data values. The augmented set of data pairs is stored 616 in a lookup table. Once the calibration period is complete, the feedback loop may be disabled 618 for increased power efficiency. The input of the device (e.g., the baseband amplitude or phase signal) is then pre-distorted 620 based on the augmented set of data pairs stored in the lookup table.

The methods and systems of the present invention may be realized in software, hardware, or a combination of software and hardware. Any type of computing system or other apparatus adapted for realizing the methods described herein is suitable. In the present context, a program may include any expression, in any language, code or notation, of a set of instructions intended to cause a system having an information processing capability to perform a particular function. It is intended that the foregoing detailed description be regarded as illustrative rather than limiting, and that it be understood that the following claims, including all equivalents, are intended to define the scope of this invention.

The invention claimed is:

1. A system for processing a communication signal including a baseband amplitude component and a baseband phase component, comprising:
an amplitude predictor configured to provide a closed-loop amplitude correction signal for closed-loop pre-distortion of a baseband amplitude component;
an amplitude lookup table configured to provide an open-loop amplitude correction signal for open-loop pre-distortion of the baseband amplitude component;
an amplitude interpolator configured to build up the amplitude lookup table with a plurality of amplitude correction values during a closed-loop calibration period;
a phase predictor configured to provide a closed-loop phase correction signal for closed-loop pre-distortion of a baseband phase component;
a phase lookup table configured to provide an open-loop phase correction signal for open-loop pre-distortion of the baseband phase component; and
a phase interpolator configured to build up the phase lookup table with a plurality of phase correction values during a closed-loop calibration period.

2. A system as in claim 1, further comprising:
an amplitude synchronizer in communication with the amplitude predictor and the amplitude lookup table;
wherein the amplitude synchronizer is configured to receive the closed-loop amplitude correction signal from the amplitude predictor during the closed-loop calibration period; and
wherein the amplitude synchronizer is further configured to receive the open-loop amplitude correction signal from the amplitude lookup table during an open-loop operation period; and
wherein the amplitude synchronizer is further configured to generate a pre-distorted baseband amplitude signal.

3. A system as in claim 1, further comprising:
a phase synchronizer in communication with the phase predictor and the phase lookup table;
wherein the phase synchronizer is configured to receive the closed-loop phase correction signal from the phase predictor during the closed-loop calibration period;
wherein the phase synchronizer is further configured to receive the open-loop phase correction signal from the phase lookup table during an open-loop operation period; and
wherein the phase synchronizer is further configured to generate a pre-distorted baseband phase signal.

4. A system as in claim 3, wherein the pre-distorted baseband phase signal includes a pair of IQ signals.

5. A transmitter for transmitting a communication signal based on a baseband signal including a baseband amplitude component and a baseband phase component, comprising:
a power amplifier; and
a baseband processor in communication with the power amplifier, wherein the baseband processor includes:
an amplitude predictor configured to provide a closed-loop amplitude correction signal for closed-loop pre-distortion of a baseband amplitude component;
an amplitude lookup table configured to provide an open-loop amplitude correction signal for open-loop pre-distortion of the baseband amplitude component;
an amplitude interpolator configured to build up the amplitude lookup table with a plurality of amplitude correction values during a closed-loop calibration period;
a phase predictor configured to provide a closed-loop phase correction signal for closed-loop pre-distortion of a baseband phase component;
a phase lookup table configured to provide an open-loop phase correction signal for open-loop pre-distortion of the baseband phase component; and
a phase interpolator configured to build up the phase lookup table with a plurality of phase correction values during a closed-loop calibration period.

6. A transmitter as in claim 5, further comprising:
a power control module configured to control a power output of the power amplifier.

* * * * *